(12) United States Patent
Becker

(10) Patent No.: US 6,275,026 B1
(45) Date of Patent: Aug. 14, 2001

(54) POSITION SENSING DEVICE

(75) Inventor: David L. Becker, White Lake, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/371,651

(22) Filed: Aug. 10, 1999

(51) Int. Cl.⁷ ...................................................... G01B 7/14
(52) U.S. Cl. .............................. 324/207.2; 324/207.24; 324/207.26; 280/735
(58) Field of Search ........................... 324/207.2, 207.21, 324/207.24, 207.25, 207.26; 280/735; 341/15

(56) References Cited

U.S. PATENT DOCUMENTS

| | | |
|---|---|---|
| 2,927,627 | 3/1960 | Lohr . |
| 2,982,335 | 5/1961 | Garvey . |
| 2,983,545 | 5/1961 | Garvey et al. . |
| 3,059,960 | 10/1962 | Komorowski et al. . |
| 3,183,314 | 5/1965 | Pickles . |
| 3,657,687 * | 4/1972 | Kobayashi .............................. 338/32 |
| 4,204,255 | 5/1980 | Cremer . |
| 4,853,629 | 8/1989 | Rops . |
| 4,909,560 | 3/1990 | Ginn . |
| 4,970,463 | 11/1990 | Wolf et al. . |
| 5,029,304 | 7/1991 | Tolmie, Jr. . |
| 5,469,054 | 11/1995 | Bicking . |
| 5,493,216 * | 2/1996 | Asa .................................... 324/207.2 |
| 5,542,493 | 8/1996 | Jacobson et al. . |
| 5,606,255 | 2/1997 | Shimbo et al. . |
| 5,608,317 | 3/1997 | Hollmann . |
| 5,742,986 | 4/1998 | Corrion et al. . |
| 5,803,491 * | 9/1998 | Barnes et al. ......................... 280/735 |
| 5,977,152 * | 11/1999 | Schulz ....................................... 322/3 |
| 6,095,555 * | 8/2000 | Becker et al. ........................ 280/735 |
| 6,113,139 * | 9/2000 | Heximer et al. ....................... 280/735 |

* cited by examiner

Primary Examiner—Christine Oda
Assistant Examiner—Anthony Jolly
(74) Attorney, Agent, or Firm—Tarolli, Sundheim, Covell, Tummino & Szabo, L.L.P.

(57) ABSTRACT

A device (10) for sensing a predetermined relative position of first and second parts (12 and 18) which are movable relative to each other includes a magnet (92) which creates a magnetic field and a pivotal lever (100) which has first and second opposite surfaces (104 and 106). The lever (100) has a first position in the magnetic field wherein the first surface (104) has a first magnetic polarity and the second surface (106) has a magnetic polarity opposite the first magnetic polarity. The lever (100) has a second position in the magnetic field when the first and second parts (12 and 18) are in the predetermined relative position. The first and second surfaces (104 and 106) move away from the magnet (92) as the lever (100) pivots from the first position to the second position. The first magnetic polarity of the first surface (104) switches to an opposite second magnetic polarity when the lever (100) is in the second position, and the second surface (106) switches to a magnetic polarity opposite the second magnetic polarity when the lever (100) is in the second position. The device (10) also includes a Hall effect device (90) which responds to the change in magnetic polarity from the first magnetic polarity to the second magnetic polarity.

7 Claims, 4 Drawing Sheets

POSITION SENSING DEVICE

TECHNICAL FIELD

The present invention relates to a device for sensing a relative position of parts which are movable relative to each other.

BACKGROUND OF THE INVENTION

It is often desirable to determine a relative position of parts which are movable relative to each other. In order to achieve this purpose, numerous position sensing devices have been developed. Known position sensing devices utilize limit switches, ultrasonic sensors, infrared sensors, microwave sensors or a combination of various sensing devices to detect a relative position of parts which are movable relative to each other.

SUMMARY OF THE INVENTION

A device for sensing a predetermined relative position of first and second parts which are movable relative to each other includes a magnet which creates a magnetic field and a pivotal lever which has first and second opposite surfaces. The lever has a first position in the magnetic field wherein the first surface has a first magnetic polarity and the second surface has a magnetic polarity opposite the first magnetic polarity. The lever has a second position in the magnetic field when the first and second parts are in the predetermined relative position.

The first and second surfaces move away from the magnet as the lever pivots from the first position to the second position. The first magnetic polarity of the first surface switches to an opposite second magnetic polarity when the lever is in the second position, and the second surface switches to a magnetic polarity opposite the second magnetic polarity when the lever is in the second position. The device also includes a Hall effect device which responds to the change in magnetic polarity from the first magnetic polarity to the second magnetic polarity.

BRIEF DESCRIPTION OF THE DRAWINGS

The foregoing and other features of the invention will become more apparent to one skilled in the art upon consideration of the following description of the invention and the accompanying drawings in which.

DESCRIPTION OF A PREFERRED EMBODIMENT

Figure 1:
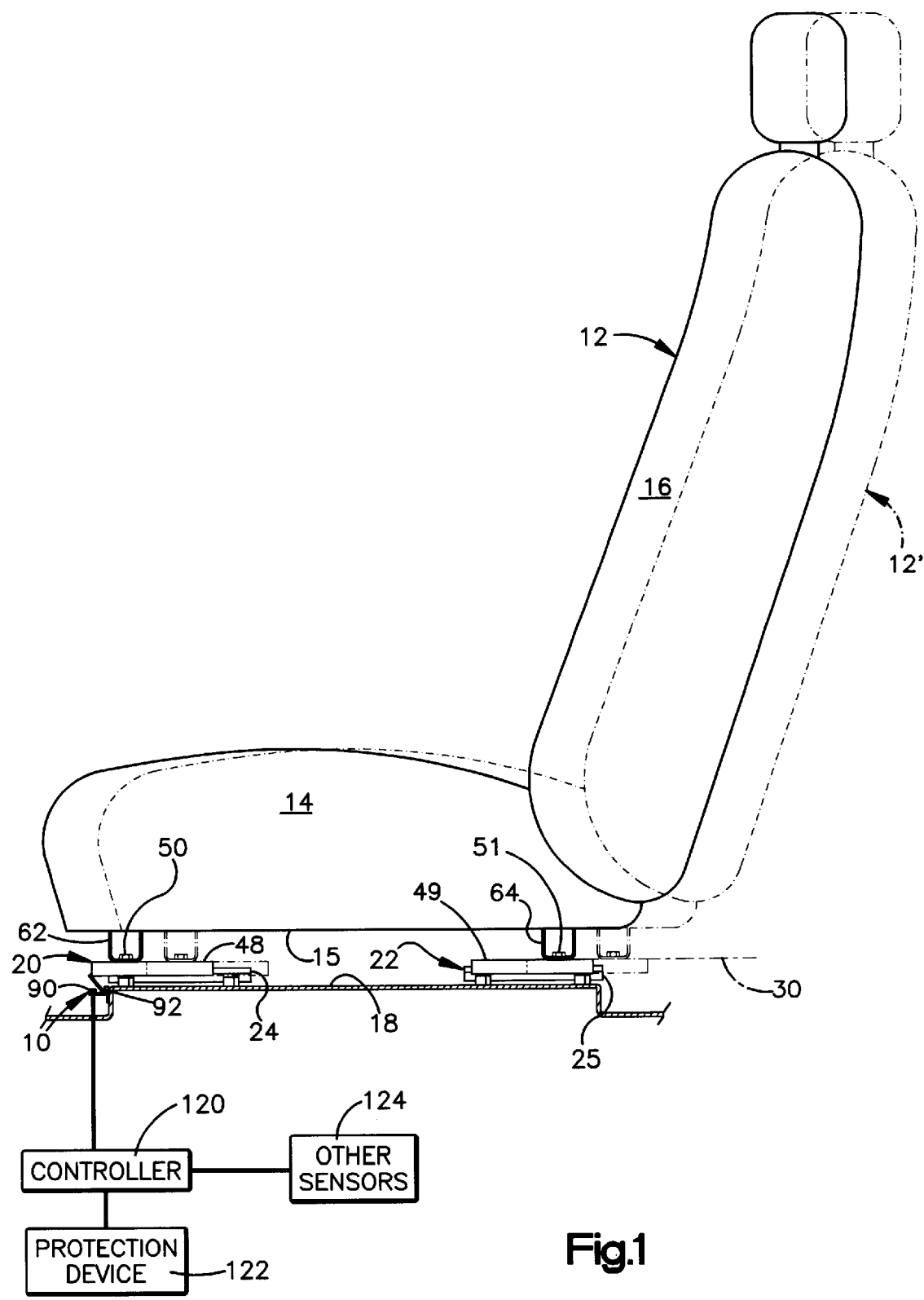
FIG. 1 is a side elevation of a device for sensing the a relative position of parts which are movable relative to each other with certain parts shown schematically.

FIG. 1 illustrates a device 10 for sensing a predetermined relative position of parts which are movable relative to each other. In the illustrated embodiment, the device 10 is used to sense a relative position of a first part which comprises a vehicle seat 12 that is movable relative to a second part which comprises a vehicle body portion 18. In the illustrated embodiment, the device 10 is used to sense a predetermined forward position of the vehicle seat 12 relative to the vehicle body portion 18. It will be recognized by those skilled in the art, however, that the device 10 can be utilized to determine a relative position of a variety of parts which are movable relative to each other.

The seat 12 includes a seat cushion portion 14 and a seat back portion 16 extending upwardly from the seat cushion portion 14. The seat 12 is located within a vehicle occupant compartment and is adjustably (movably) mounted to the lower body portion 18 of a vehicle. The seat 12 is illustrated in solid lines in a forward position, and in dotted lines in a rearward position designated at 12'.

Forward and rearward movement of the vehicle seat 12 is guided by guide tracks, indicated at 20 and 22. While FIG. 1 illustrates a pair of such guide tracks 20 and 22, it will be appreciated that typically there are four such guide tracks near the corner portions of a lower surface 15 of the seat cushion portion 14. Each guide track 20 and 22 includes a seat bracket, indicated at 24 and 25, respectively, mounted to the lower body portion 18 of the vehicle. The seat brackets 24 and 25 are formed of a suitable rigid material such as steel.

Figure 2:
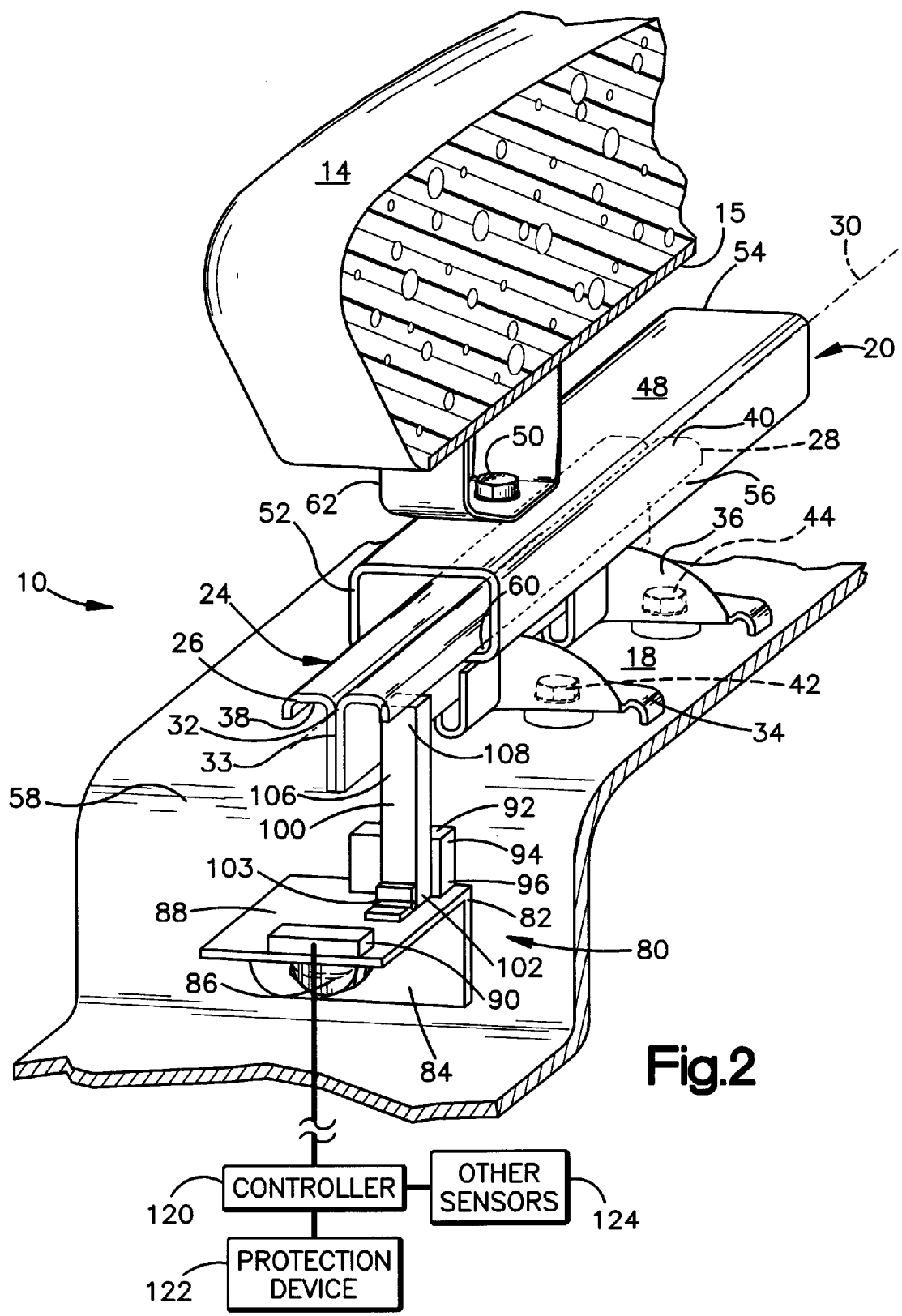
FIG. 2 is an enlarged perspective view of a portion of the device of FIG. 1, illustrating a first position of the device.
Figure 3:
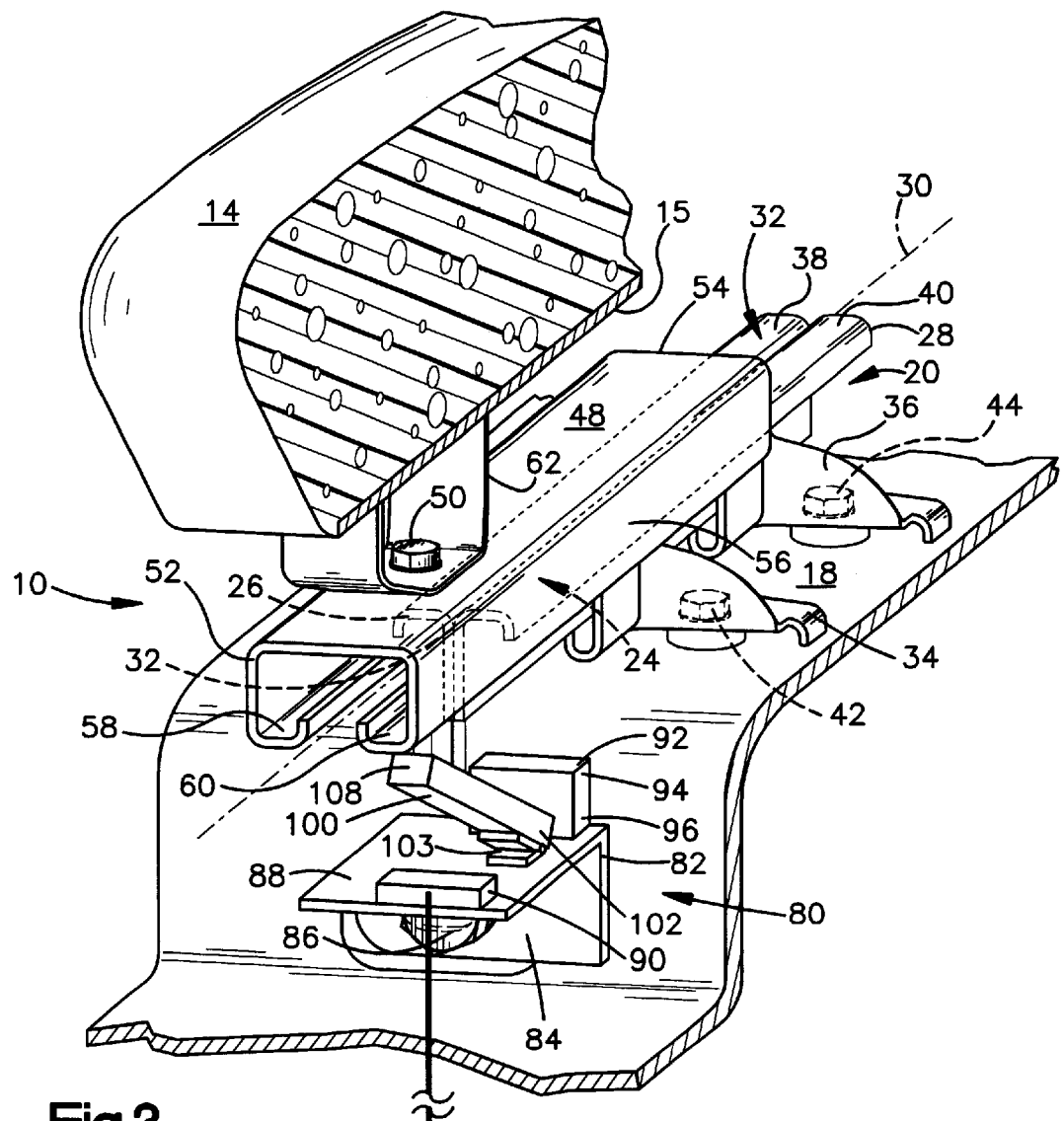
FIG. 3 is a perspective view of the device of FIG. 2, illustrating a second position of the device.

In the embodiment illustrated in FIGS. 2 and 3, the seat bracket 24 of guide track 20 is an elongated T-shaped guide member 32 connected to the lower body portion 18. The guide member 32 includes first and second spaced apart end portions 26 and 28. A longitudinal bracket axis 30 extends through the end portions 26 and 28 of the guide member 32. A vertical base portion 33 of the T-shaped guide member 32 is supported by a pair of spaced apart bracket members 34 and 36. The bracket members 34 and 36 are secured to the lower vehicle body portion 18 by fasteners, illustrated at 42 and 44. The T-shaped member 32 includes laterally extending opposed flanged portions 38 and 40. The flanged portions 38 and 40 extend outwardly transverse to the vertical base portion 33 and curve downwardly towards the lower body portion 18. The flanged portions 38 and 40 form a pair of adjacent, longitudinal channels which extend parallel to the bracket axis 30.

The seat bracket 25 is substantially identical to the seat bracket 24 described above. Alternatively, a single elongated seat bracket (not shown) could be used instead of the pair of the coaxial seat brackets 24 and 25 shown in FIG. 1.

Referring to FIG. 1, the guide tracks 20 and 22 include respective elongated seat rail members 48 and 49 that are mounted to the lower surface 15 of the seat cushion portion 14 by respective fasteners 50 and 51. Each seat rail member 48 and 49 is supported by a respective seat bracket 24 and 25. Each rail member 48 and 49 is also supported by and movable relative to a respective one of the seat brackets 24 and 25 in a direction generally parallel to the bracket axis 30. Thus, the guide tracks 20 and 22 support the seat 12 and allow for forward and rearward movement of the seat 12 in the vehicle.

As shown in FIGS. 2 and 3, the seat rail member 48 has first and second spaced apart end portions 52 and 54, with an elongated body portion 56 extending between the end portions 52 and 54. The body portion 56 has a generally rectangular cross-section and elongated sidewall portions. A pair of opposed upturned flange portions extend longitudinally along a lower sidewall portion of the body portion 56 to define substantially parallel elongated channel portions 58 and 60. The elongated channel portions 58 and 60 receive and slidably engage the respective flanged portions 38 and 40 of the T-shaped guide member 32, which supports the seat 12 for longitudinal movement substantially parallel to the bracket axis 30. Appropriate bearings (not shown) also may be used to support the seat and facilitate the longitudinal movement of the seat rail member 48 relative to the seat bracket 24.

The seat rail member 49 is substantially identical to the rail member 48 described above. Alternatively, a single elongated rail member (not shown) could be used instead of the two spaced apart rail members 48 and 49 shown in FIG. 1.

The seat cushion portion 14 is mounted to and spaced apart from the seat rail member 48 and 49 by respective frame members 62 and 64. The frame members 62 and 64 extend downwardly from the lower surface 15 of the seat cushion portion 14. The frame members 62 and 64 are secured to the upper surface of the rail members 48 and 49 by the fasteners 50 and 51, respectively.

While a preferred embodiment of the guide tracks 20 and 22 has been described, it will be understood and appreciated by those skilled in the art that the device of the present invention may be used with any known type of guide track.

Referring to FIGS. 2 and 3, the device 10 comprises a position sensing switch 80 which is supported by an L-shaped support bracket 82. The support bracket 82 includes a base member 84 which is fixed to the vehicle body portion 18 by a fastener 86. The support bracket 82 also includes a support member 88 which extends perpendicularly from the base member 84 in a direction generally parallel to the bracket axis 30. The support bracket 82 is positioned below the end portion 26 of the guide member 32 and extends beyond the first end portion 26 of the guide member 32. As the rail member 48 moves towards the forward position of FIG. 3, the end portion 52 of the rail member 48 extends above the support bracket 82 and overlies the support member 88.

The switch 80 includes a Hall effect device 90 and a permanent magnet 92 which are mounted spaced apart from each other on the support member 88. The Hall effect device 90 and the magnet 92 are positioned such that the Hall effect device 90 is within the magnetic field of the magnet 92. The magnet 90 includes a north pole 94 and an opposite south pole 96. The south pole 96 is positioned adjacent to the support member 88. The Hall effect device 90 and the magnet 92 are fixed to the support member 88 by known means such as an adhesive.

The switch 80 includes a lever 100 which has a first end 102 pivotally fixed to the support member 88 by means 103 such as a hinge. The lever 100 is positioned adjacent to the magnet 92, between the magnet 92 and the Hall effect device 90. The lever 100 has a generally elongated rectangular shape and is constructed of a ferromagnetic material. The lever 100 is pivotable from a first, unactuated position (FIG. 2) to a second, actuated position (FIG. 3). The lever 100 is biased towards the unactuated position by a biasing member (not shown) such as a spring. The lever 100 may also be attracted to the unactuated position by the magnetic forces of the magnet 92 acting on the ferromagnetic material of the lever 100.

Figure 4:
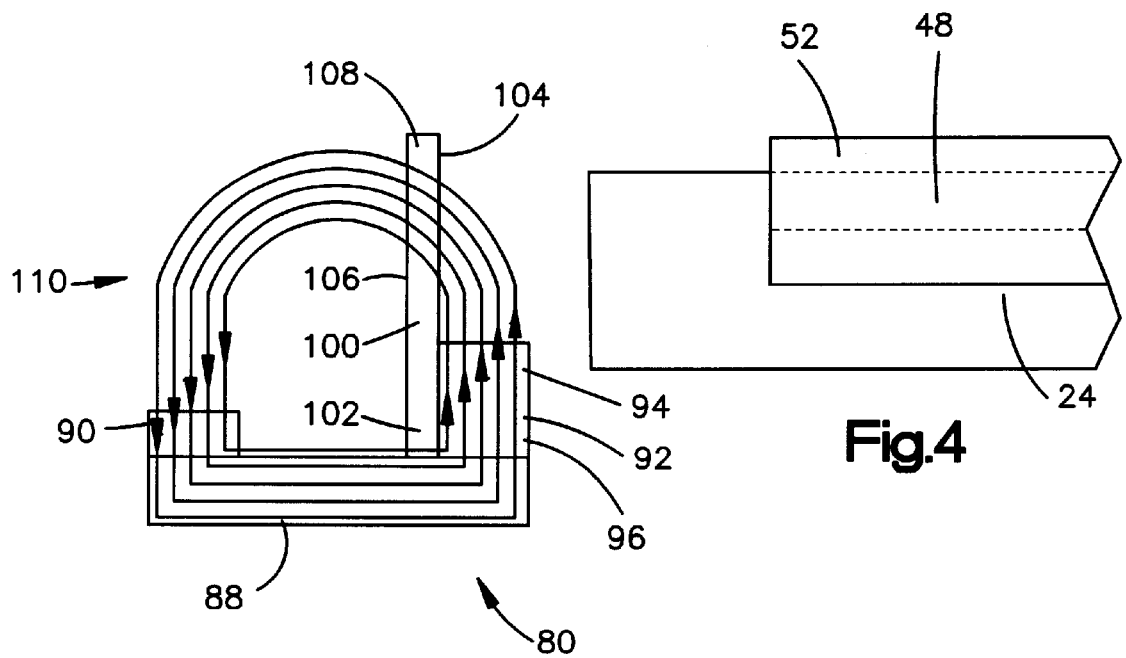
FIG. 4 is an enlarged sectional schematic view of a portion of the device as viewed along line 4—4 in FIG. 2.

In the unactuated condition, a first surface 104 (FIG. 4) of the lever 100 is positioned adjacent to the magnet 92. A second surface 106 of the lever 100 is located opposite the first surface 104. The switch 80 (FIG. 2) is positioned such that a second end 108 of the lever 100, opposite the first end 102, extends into the path that the rail member 48 moves as the seat 12 is adjusted between the rearward and forward positions.

When the vehicle seat 12 is in the rearward position (FIG. 2), the switch 80 is in an unactuated condition and the lever 100 is maintained in the unactuated position. This is best shown in the enlarged view of FIG. 4. In the unactuated position, the first surface 104 of the lever 100 is positioned adjacent to the magnet 92 along the north and south poles 94 and 96 of the magnet 92. The first surface 104 of the lever 100 has a south polarity and the second surface 106 of the lever 100 has a north polarity, opposite the polarity of the first surface 104.

A magnetic field is conducted in a path between north and south poles 94 and 96 of the magnet 92. When the switch is in the unactuated condition, the path of the magnetic field extends through an air space 110 between the magnet 92 and the Hall effect device 90. The path of the magnetic field also extends through the support member 88. Thus, when the seat 12 is in the rearward position, a magnetic field of a first flux density acts on the Hall effect device 90. The magnetic field of the first flux density is indicated generally by the arrows shown in FIG. 4.

When the vehicle seat 12 is in the rearward position, the first flux density of the magnetic field which acts on the Hall effect device 90 is relatively high. As a result, the Hall effect device 90 has a high (or "on") condition with a corresponding high output signal when the vehicle seat 12 is in the rearward position.

Figure 5:
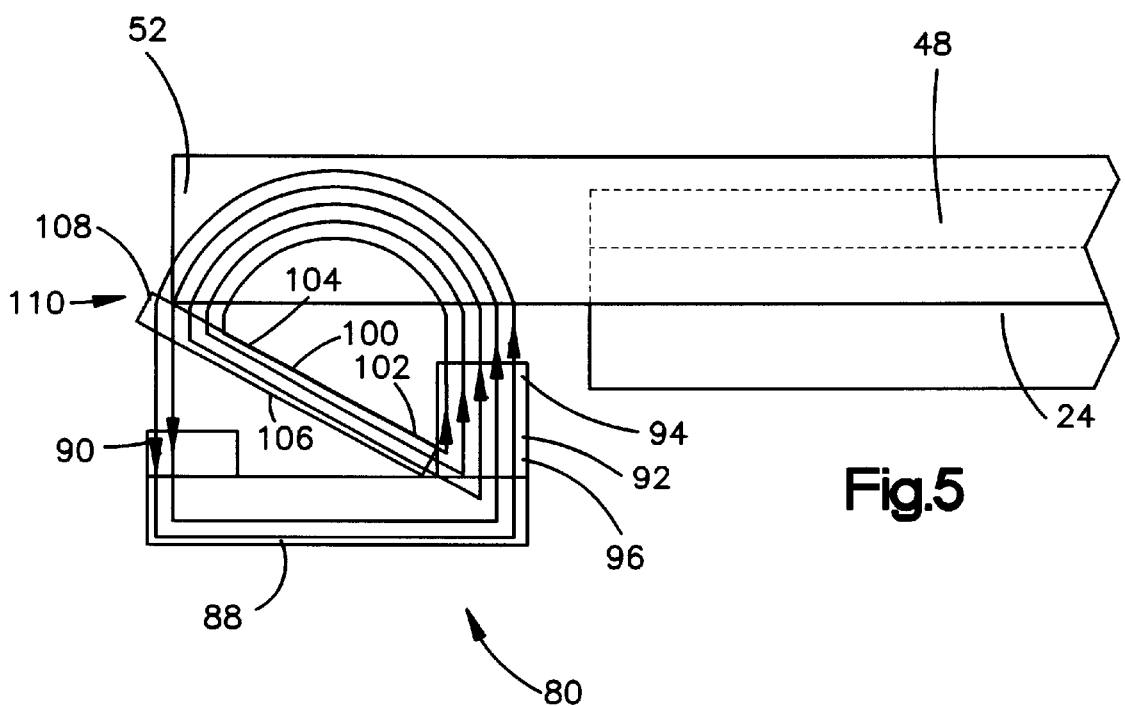
FIG. 5 is an enlarged sectional schematic view of a portion of the device as viewed along line 5—5 in FIG. 3.

As the vehicle seat 12 is adjusted forward from the rearward position of FIG. 2, the end portion 52 of the rail member 48 engages the second end 108 of the lever 100 and moves the lever 100 away from the magnet 92 towards the actuated position. When the seat 12 reaches a predetermined forward position, the lever 100 reaches the actuated position of FIG. 3 and the switch 80 is in an actuated condition. This is best shown in the enlarged view of FIG. 5. As the seat 12 is adjusted forward of the predetermined forward position, the lever 100 is maintained in the actuated position by the rail member 48. Thus, the switch 80 remains in the actuated condition as the seat 12 is adjusted to any position at or forward of the predetermined forward position.

As the lever 100 pivots towards the actuated position, the lever 100 moves away from the magnet 92. As the lever 100 pivots, the first end 102 of the lever remains adjacent to the south pole 96 of the magnet. When the lever 100 reaches the actuated position, the polarization of the lever 100 reverses. As a result, the first surface 104 of the lever 100 has a north polarity and the second surface 106 has a south polarity, opposite the polarity of the first surface 104.

When the seat 12 is at or forward of the predetermined forward position, the air space 110 is occupied by the lever 100 and the rail member 48. The reversed polarity of the lever 100 causes the magnetic field to be conducted by the lever 100 away from the Hall effect device 90 in a path between the north and south poles 94 and 96 of the magnet 92. Thus, when the seat 12 is at or forward of the predetermined forward position, a magnetic field of a second flux density, different than the first flux density, acts on the Hall effect device 90. The magnetic field of the second flux density is indicated generally by the arrows shown in FIG. 5.

When the vehicle seat 12 is at or forward of the predetermined forward position, the second flux density of the magnetic field which acts on the Hall effect device 90 is relatively low. As a result, the Hall effect device 90 has a low (or "off") condition with a corresponding low output signal when the vehicle seat 12 is at or forward of the predetermined forward position.

Thus, the switch 80 senses a relative position of parts which are movable relative to each other. The Hall effect device 90 is switched from a first condition with a first output signal when the vehicle seat 12 is rearward of the predetermined forward position to a second, different condition with a correspondingly different output signal when the seat 12 is at or forward of the predetermined forward position.

The predetermined forward position is determined by the position of the switch 80 relative to the seat rail 48 and can be modified by adjusting the position of the switch 80. For example, it may be desired to detect when the seat 12 is at or within 100 millimeters of its full-forward position. In this instance, the position of the switch 80 would be adjusted such that the end portion 52 of the rail member 48 moves the lever 100 to the actuated position when the seat 12 is 100 millimeters from its full-forward position. Thus, the Hall effect device 90 would have a low (or "off") condition with a corresponding low output signal when the vehicle seat 12 is at or within 100 millimeters of its full-forward position.

The information provided by the device 10 can be used to control the operation of a vehicle occupant protection device. Depicted schematically in FIGS. 1–3, the output signal from Hall effect device 90 is directed to a controller 120. The controller 120 may comprise a microcomputer, an integrated circuit, a plurality of discrete components or a combination of integrated circuits and discrete components configured to provide desired functions.

The controller 120 is electrically coupled to an actuatable vehicle occupant protection device 122 for, when actuated, helping to protect a vehicle occupant in a crash event. The protection device 122 suitably is an air bag, such as for a driver or front passenger of the vehicle. Other actuatable vehicle occupant protection devices that can be used in accordance with the present invention include, for example, inflatable knee bolsters, and knee bolsters operated by inflatable air bags. The controller 120 also is coupled to other sensors, schematically indicated at 124. The other sensors 124 may include, for example, a crash sensor, a seat belt buckle switch sensor, a vehicle speed sensor, an occupant weight sensor or any other sensing device or combination of devices which provide useful information concerning actuation of the protection device 122. The other sensors 124 provide signals to the controller 120 indicative of one or more vehicle and occupant conditions.

The controller 120 utilizes the output signal from Hall effect device 90 to control the actuation of the protection device 122. For example, where the output signal of the Hall effect device 90 indicates that the seat 12 is at or forward of the predetermined forward position, the controller 120 may control actuation of the occupant protection device 122 so that its inflation is somewhat delayed. Under appropriate circumstances, the output signal of the Hall effect device 90 also might be used by the controller 120, in combination with the signals from the other sensors 124, to delay or even prevent actuation of the protection device 122.

From the above description of the invention, those skilled in the art will perceive improvements, changes and modifications. Such improvements, changes and modifications within the skill of the art are intended to be covered by the appended claims.

What is claimed is:

1. A device for sensing a predetermined relative position of first and second parts which are movable relative to each other, said device comprising:

a magnet which creates a magnetic field;

a Hall effect device in said magnetic field;

a pivotal lever having first and second opposite surfaces, said lever having a first position in said magnetic field wherein said first surface has a first magnetic polarity and said second surface has a magnetic polarity opposite said first magnetic polarity and wherein a magnetic field of a first flux density acts on said Hall effect device to cause said Hall effect device to have a first output signal when said lever is in said first position;

said lever having a second position in said magnetic field when said first and second parts are in said predetermined relative position wherein a magnetic field of a second flux density acts on said Hall effect device to cause said Hall effect device to have a second output signal when said lever is in said second position, different than said first output signal, said first and second surfaces moving away from said magnet as said lever pivots from said first position to said second position, said first magnetic polarity of said first surface switching to an opposite second magnetic polarity when said lever is in said second position, said second surface switching to a magnetic polarity opposite said second magnetic polarity when said lever is in said second position, said switching of said magnetic polarity causing said magnetic flux density to change from said first flux density to said second flux density; and said Hall effect device responding to the change in magnetic flux density from said first flux density to said second flux density.

2. A device as defined in claim 1, wherein one of said first and second parts moves said lever from said first position to said second position.

3. A device as defined in claim 1, wherein said lever conducts said magnetic field of said second flux density.

4. A device as defined in claim 1, wherein said device senses a position of a vehicle seat in a vehicle.

5. A device as defined in claim 3, wherein said first part comprises a vehicle seat and said second part comprises a part of a vehicle body.

6. Device as defined in claim 5 further including an actuatable vehicle occupant protection device for, when actuated, helping to protect a vehicle occupant, and a controller for controlling actuation of said vehicle occupant protection device in response to said first and second output signals from said Hall effect device.

7. Device as defined in claim 6 wherein said controller delays actuation of said vehicle occupant protection device in response to said second output signal of said Hall effect device when said vehicle seat is at or forward of said predetermined forward position.

* * * * *

UNITED STATES PATENT AND TRADEMARK OFFICE
CERTIFICATE OF CORRECTION

PATENT NO. : 6,275,026 B1
DATED : August 14, 2001
INVENTOR(S) : David L. Becker

It is certified that error appears in the above-identified patent and that said Letters Patent is hereby corrected as shown below:

<u>Column 6,</u>
Line 45, change "3" to -- 4 --.

Signed and Sealed this

Fourteenth Day of May, 2002

*Attest:*

JAMES E. ROGAN
*Attesting Officer*     *Director of the United States Patent and Trademark Office*